W. SCHMIDT.
BEET PULLER.
APPLICATION FILED APR. 18, 1919.

1,340,796.

Patented May 18, 1920.
3 SHEETS—SHEET 1.

Inventor
Wilhelm Schmidt
by Fred P. Lorin
Atty.

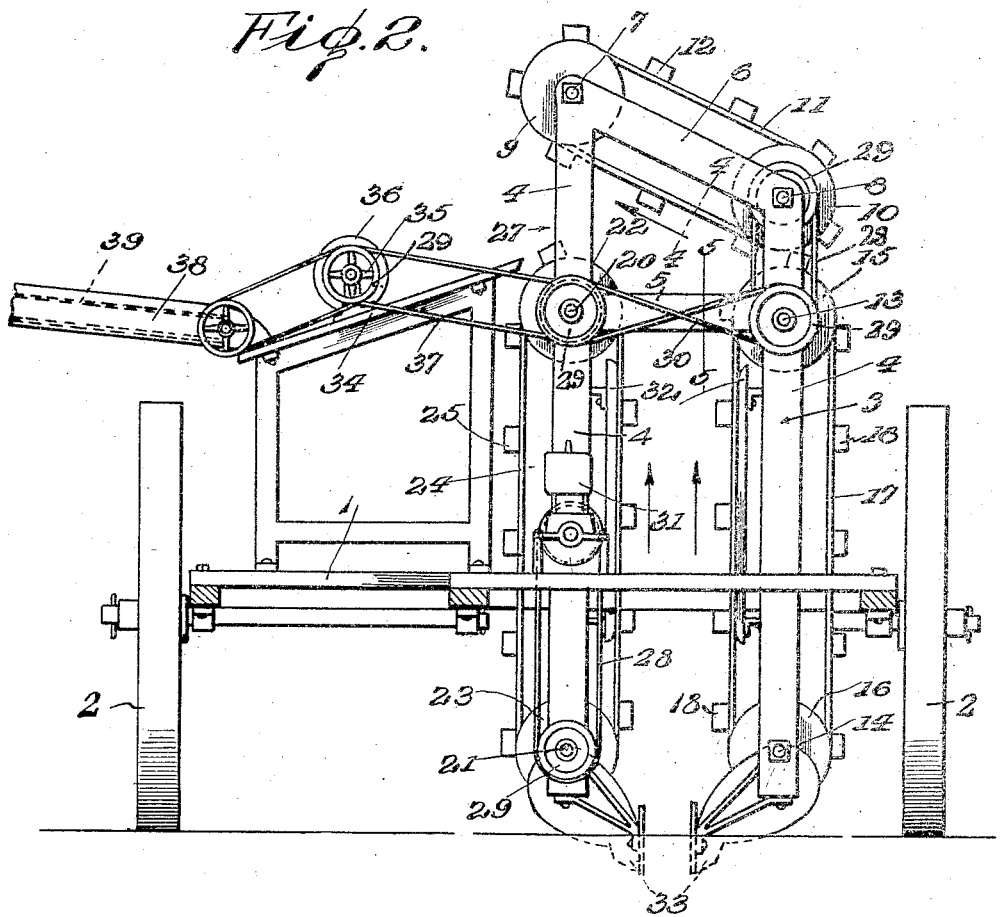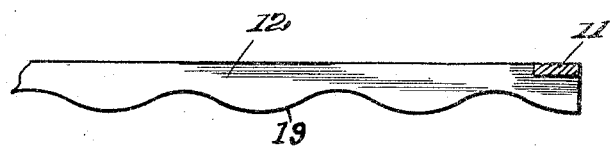

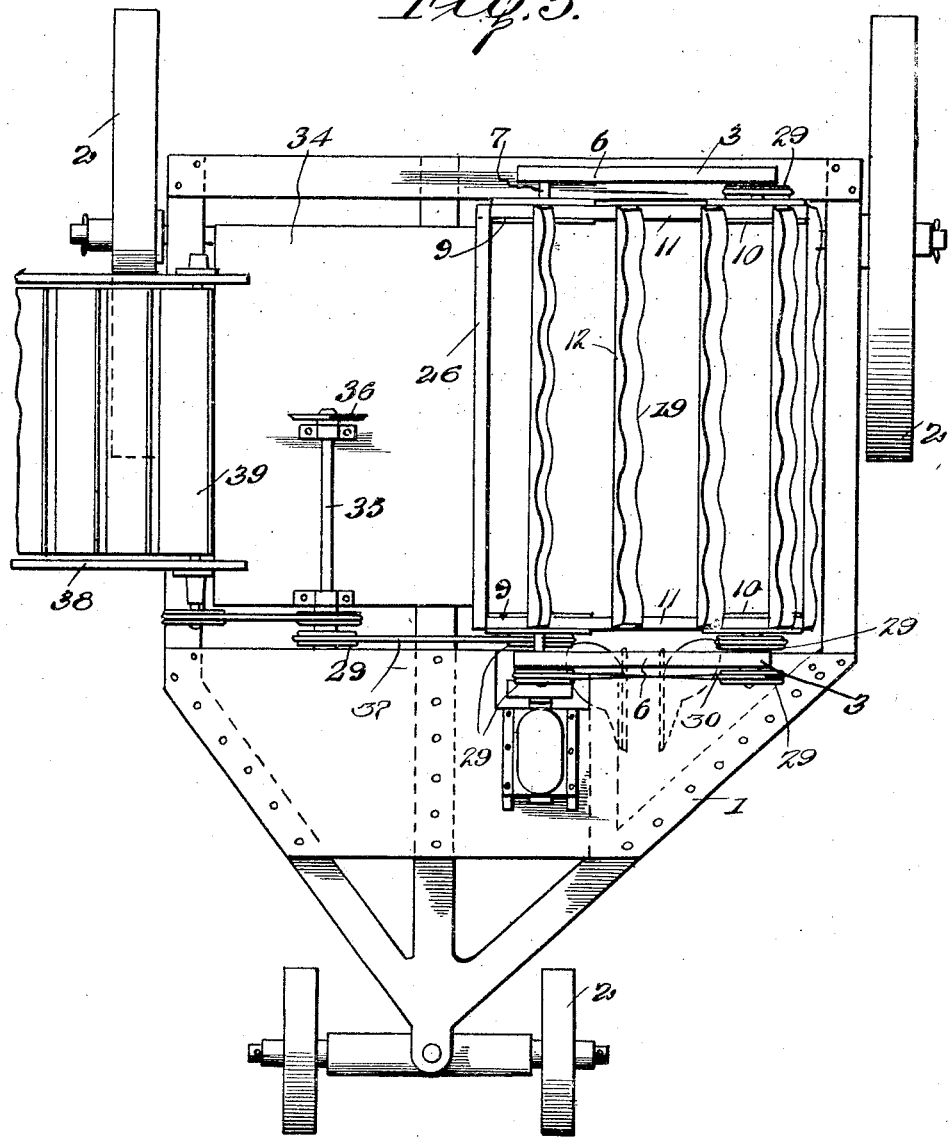

UNITED STATES PATENT OFFICE.

WILHELM SCHMIDT, OF MONROE, WASHINGTON.

BEET-PULLER.

1,340,796.  Specification of Letters Patent.  Patented May 18, 1920.

Application filed April 18, 1919. Serial No. 290,975.

*To all whom it may concern:*

Be it known that I, WILHELM SCHMIDT, a citizen of the United States, residing at Monroe, in the county of Snohomish and State of Washington, have invented certain new and useful Improvements in Beet-Pullers, of which the following is a specification.

This invention relates to an improvement in vegetable diggers, wherein provision is made for digging the vegetables from the ground, elevating the vegetables to an appreciable distance above the digging point to free them from accumulated dirt, and directing the vegetables laterally on to a table.

The characteristic features of the present invention reside in the provision of a grasping elevator, by means of which the plant portions of the vegetables are grasped as they are lifted from the ground by the plows, and through which elevator the vegetables so grasped are lifted directly upward and with a sufficient agitation to free the bulbous portions of the vegetables of the dirt remaining thereon.

In the accompanying drawings:—

Fig. 2 is a front elevation of the same.

Fig. 3 is a plan view of the same.

Fig. 4 is a vertical section on line 4—4 of Fig. 2.

Figure 1:
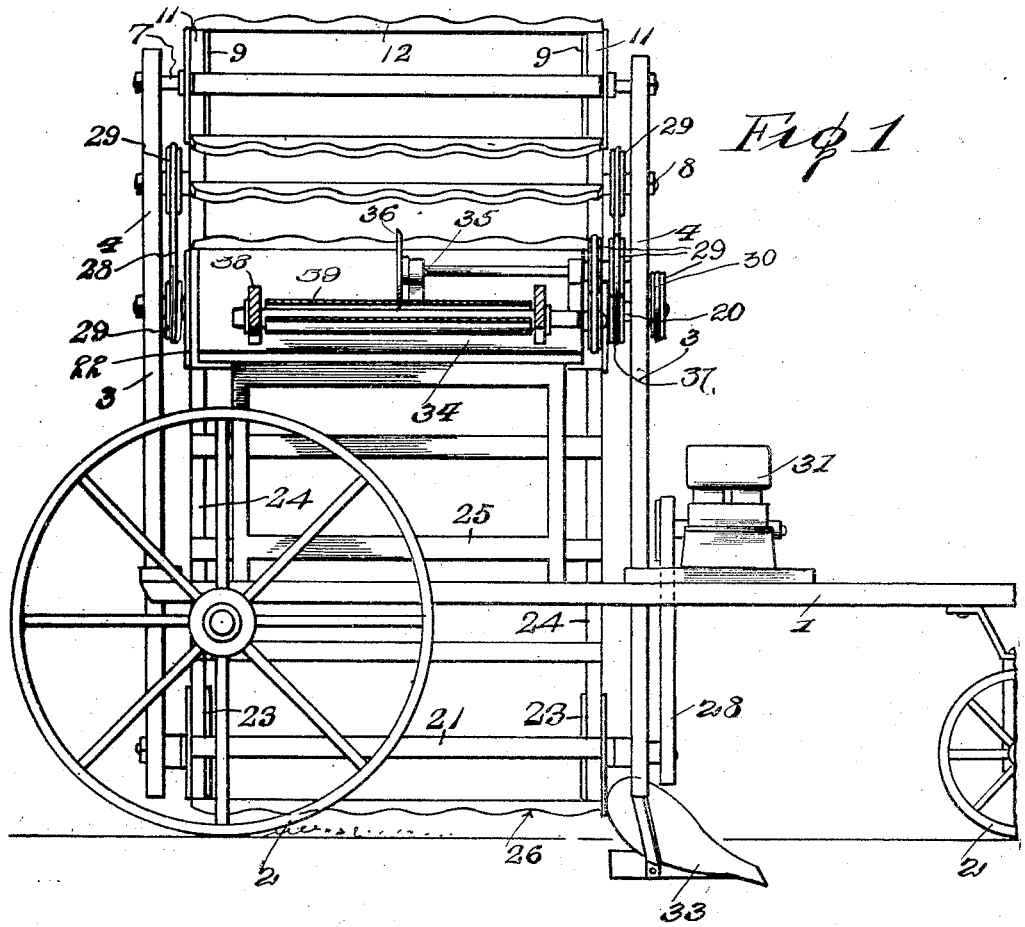
Figure 1 is a side elevation of the improved digger.
Figure 5:
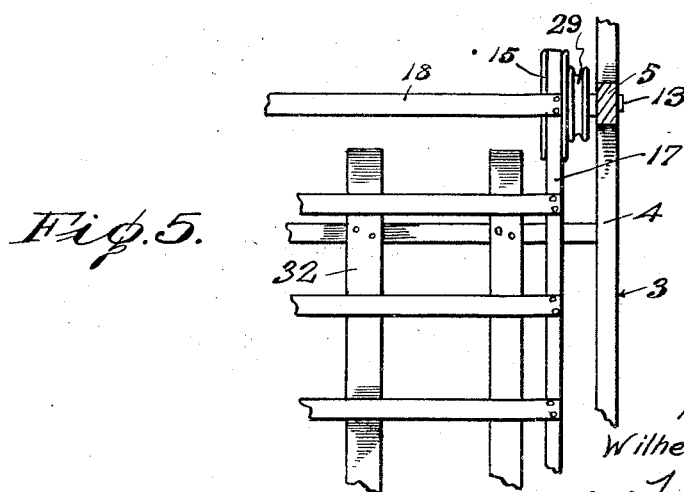
Fig. 5 is a section on line 5—5 of Fig. 2.

The improved digger comprises a main frame 1, specifically constructed to accommodate the operating details to be later described and supported on traction wheels 2 by which the digger is moved over the ground with the wheels on opposite sides of the particular row of vegetables to be dug.

A grasping elevator structure is supported on the main frame preferably to one side of the center thereof and toward the rear. This grasping elevator comprises end frames 3, of skeleton form including spaced parallel uprights 4, connected by bridge bars 5 and an upper connecting bar 6 which inclines downwardly from the inner side of the elevator. The respective end frames 3, which of course are rigidly supported in the main frame, are connected at the respective terminals of the bars 6 by tie rods 7 and 8 respectively, which rods serve as shafts to rotatively support on each spaced grooved wheels, as 9 on the shaft 7 and 10 on the shaft 8. Belts 11 connect the alined wheels 9 and 10, and these belts are connected by flights 12. Connecting the relatively outer uprights 4 of the end frames 3 are tie rods 13 and 14 on which are rotatively mounted grooved wheels, as 15 on the rod 13, and 16 on the rod 14. The alined wheels 15 and 16 are connected by belts 17 and flights 18 are secured to the respective belts. The flights 12 and 18 are corrugated as at 19 on their working surfaces, that is the surfaces remote from the belts, for a purpose which will later appear. The upper rod shaft 13 of this section of the elevator is arranged as closely as possible to the shaft 8 of the upper section without interference between the respective sets of flights. The inner uprights 4 of the end frames 3 are connected by upper and lower rod shafts 20 and 21 on which are mounted spaced grooved wheels, as 22 on the shaft 20, and 23 on the shaft 21. Belts 24 travel over the alined wheels 22 and 23, these belts being connected by flights 25. Said flights 25 are also preferably corrugated on their working faces, as at 26. The upper limit of travel of the flights 25 is below the extreme upper section of the elevator, leaving an appreciable space as 27, between the extreme upper path of the flights 25 and the overlying flights 12.

Respective grooved wheels of the flight belts are interconnected through drive belts 28 and drive pulleys 29 to compel simultaneous movement of all of the flight belts, the drive pulley 29 for the inner vertically operating flight belt being connected with the drive pulley 29 of the relatively outer flight belt by a cross belt 30, and an appropriate drive pulley 29 may be operated by an engine 31, mounted on the main frame.

The inner paths of the vertical sections of the elevator will thus travel in the same direction, that is upwardly and these flight paths are maintained slightly spaced apart in order to grasp the plant of a vegetable between them, guide strips 32, carried by the uprights 4 preventing an undue outward yielding of the flights in their upward movement. The upper incline section of the elevator is connected by the belts 28, so that the lower flight path is inward.

The digging device comprises plow shares 33 with their land sides adjacent, the shares being supported from the main frame or from the forward end frame 3 of the elevator.

The plow shares are thus arranged at one end of the elevator and the latter as will be plain from Fig. 1, extends rearwardly of the digger for a considerable distance.

Supported on the main frame immediately adjacent and slightly below the elevator discharge opening 27 is a receiving table 34, on which is mounted, as on a standard 35, a disk cutter 36 driven by a belt 37 from a convenient drive pulley 29. Resting upon what may be termed the outer edge of this table is a chute 38, the opposite end of which projects preferably a distance beyond the main frame to permit such end to overlie the box body for a wagon (not shown) to receive the vegetables. Other receivers may be used, though a wagon is preferred, as it may travel with the digger until loaded. Within the chute 38 is an ordinary type of endless conveyer 39, driven from any appropriate driving part of the digger.

In use the vegetables, as for example beets, are forced from the ground and elevated to some extent by the plows 33. The plant portion is grasped by the opposed flights 18 and 25 and directly elevated. During this elevation the bulbous portion of the vegetable, which is pendent below the particular grasping flights, is sufficiently agitated to remove therefrom all clinging dirt. At the upper limit of movement of the flights 25 the vegetables are moved laterally by the upper incline section of the elevator and discharged through the opening 27 on to the table 34. Here an operator separates the plants and bulb portions by bringing the vegetable into contact with the cutting disk following which the bulbous portion is thrown into the chute 38 and conveyed to the receiver.

In the foregoing a cutter 36 and conveyer 38, are described in connection with the digger, elevators and table, but they are independent of the invention and are not claimed.

What is claimed as new is:—

1. A vegetable digger comprising opposing plow shares to elevate the soil and vegetable, and a grasping elevator mounted above the plows and comprising opposed sets of vertically traveling flights between which the plant portion of the vegetable may be grasped, and an upper section of laterally traveling flights to direct the vegetables from the elevator.

2. A vegetable digger comprising opposing plow shares to elevate the soil and vegetable, and a grasping elevator mounted above the plows and comprising opposed sets of vertically traveling flights between which the plant portion of the vegetable may be grasped, and an upper section of laterally traveling flights to direct the vegetables from the elevator, a coöperating face of the vertical traveling flights being corrugated.

3. A vegetable digger comprising opposing plow shares to elevate the soil and vegetable, and a grasping elevator mounted above the plows and comprising opposed sets of vertically traveling flights between which the plant portion of the vegetable may be grasped, and an upper section of laterally traveling flights to direct the vegetables from the elevator, one of said vertically traveling flights being spaced from the lateral traveling flights to provide a discharge opening.

4. A vegetable digger comprising opposing plow shares to elevate the soil and vegetable, and a grasping elevator mounted above the plows and comprising opposed sets of vertically traveling flights between which the plant portion of the vegetable may be grasped, and an upper section of laterally traveling flights to direct the vegetables from the elevator, one of said vertically traveling flights being spaced from the lateral traveling flights to provide a discharge opening, and a receiving table to receive the vegetables from said discharge opening.

5. A vegetable digger comprising opposing plow shares to elevate the soil and vegetable, and a grasping elevator mounted above the plows and comprising opposed sets of vertically traveling flights between which the plant portion of the vegetable may be grasped, and an upper section of laterally traveling flights to direct the vegetables from the elevator, the vertically traveling flights moving upwardly and inwardly.

6. A vegetable digger comprising opposing plow shares to elevate the soil and vegetable, and a grasping elevator mounted above the plows and comprising opposed sets of vertically traveling flights between which the plant portion of the vegetable may be grasped, and an upper section of laterally traveling flights to direct the vegetables from the elevator, and guide bars to prevent lateral movement of the vertically moving flights when in grasping co-action.

7. A vegetable digger comprising opposing plow shares to elevate the soil and vegetable, and a grasping elevator mounted above the plows and comprising opposed sets of vertically traveling flights between which the plant portion of the vegetable may be grasped, and an upper section of laterally traveling flights to direct the vegetables from the elevator, said vertically traveling flights extending rearwardly from the plow shares for a considerable length with the line of coöperation between opposing flights substantially co-incident with the row of vegetables.

In testimony whereof I affix my signature.

WILHELM SCHMIDT.